United States Patent
Depew et al.

(10) Patent No.: US 7,350,007 B2
(45) Date of Patent: Mar. 25, 2008

(54) TIME-INTERVAL-BASED SYSTEM AND METHOD TO DETERMINE IF A DEVICE ERROR RATE EQUALS OR EXCEEDS A THRESHOLD ERROR RATE

(75) Inventors: Kevin G. Depew, Spring, TX (US); Travis D. Bishop, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 219 days.

(21) Appl. No.: 11/098,803

(22) Filed: Apr. 5, 2005

(65) Prior Publication Data

US 2006/0224808 A1    Oct. 5, 2006

(51) Int. Cl.
*G06F 13/24* (2006.01)
(52) U.S. Cl. .................. 710/267; 710/261; 714/55
(58) Field of Classification Search ........ 710/260–269, 710/48–51; 714/701–704, 718–723, 42, 714/55; 711/202
See application file for complete search history.

(56) References Cited

U.S. PATENT DOCUMENTS

| | | | |
|---|---|---|---|
| 4,809,276 A | | 2/1989 | Lemay et al. |
| 5,764,651 A | * | 6/1998 | Bullock et al. ............. 714/708 |
| 5,978,952 A | * | 11/1999 | Hayek et al. ............... 714/764 |
| 6,615,305 B1 | * | 9/2003 | Olesen et al. ............... 710/262 |
| 7,055,054 B2 | * | 5/2006 | Olarig ........................... 714/5 |
| 7,082,542 B2 | * | 7/2006 | Cooper ....................... 713/320 |
| 7,124,329 B2 | * | 10/2006 | Ackaret et al. ............... 714/42 |
| 7,124,332 B2 | * | 10/2006 | Constantinescu ............. 714/52 |
| 2004/0143719 A1 | * | 7/2004 | Nguyen et al. ............. 711/202 |
| 2004/0168101 A1 | * | 8/2004 | Kubo ............................ 714/6 |

OTHER PUBLICATIONS

Thomas M. Chalfant, "Solaris Operating System Availability Features," Sun Blue Prints OnLine—Jan. 2004, Sun Microsystems, Inc., 28 pp.

* cited by examiner

*Primary Examiner*—Raymond N Phan

(57) ABSTRACT

An apparatus and method to determine if a device error rate equals or exceeds a threshold. In an apparatus embodiment, a system comprises a device, and an interrupt handler executable by a processor. The interrupt handler executes, upon expiration of a time period, to determine if a threshold error rate associated with the device has been equaled or exceeded.

22 Claims, 3 Drawing Sheets

TIME-INTERVAL-BASED SYSTEM AND METHOD TO DETERMINE IF A DEVICE ERROR RATE EQUALS OR EXCEEDS A THRESHOLD ERROR RATE

BACKGROUND

Electronic systems include one or more devices that may experience anomalous behavior. For example, a computer typically includes one or more memory devices. Any one or more of the memory devices may experience a correctable error such as when a bit value is incorrect (a "0" that should be a "1" or vice versa), but can be corrected. As the name implies, correctable errors can be corrected to make the data accurate. The existence of correctable errors, however, may cause degraded system performance resulting in an increased likelihood of failure. A memory device may initially degrade by experiencing correctable errors, but may further degrade by experiencing uncorrectable errors. An uncorrectable error naturally cannot be corrected and may cause a system "crash" resulting in unplanned downtime and potential data corruption. Thus, it is desirable that a computer system be capable of detecting when correctable errors occur at a rate that suggests that the system is at a high risk of experiencing an uncorrectable error.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more parts and may be used to refer to a computer system or a portion of a computer system. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
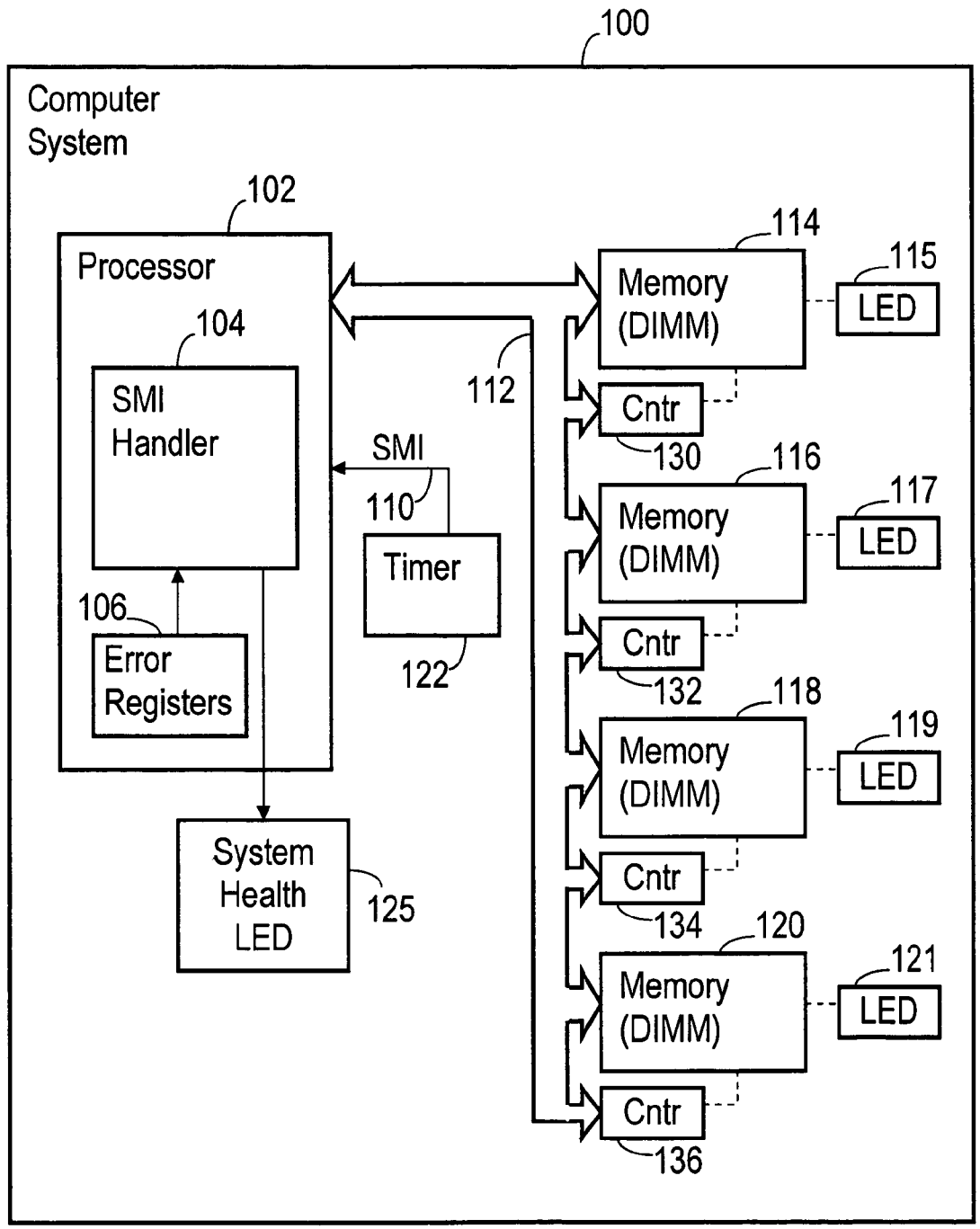
FIG. 1 shows a system in accordance with an embodiment of the invention comprising a processor and using system management interrupts to track correctable memory errors.

Referring now to FIG. 1, a system 100 is shown comprising a processor 102 and one or more devices. In the exemplary embodiment of FIG. 1, such devices comprise memory devices 114, 116, 118, and 120. Each memory device 114, 116, 118, and 120 may comprise random access memory (RAM) and may be implemented in the form of a dual in-line memory module (DIMM). Such DIMMs are generally insertable onto a system motherboard and can be removed and replaced as desired. System 100 also includes a timer 122. The processor 102 couples to the timer 122 and can access the memory devices 114, 116, 118, and 120 directly or through intervening logic (e.g., a bridge logic unit). The processor 102 may also comprise error registers 106 which may store information regarding errors detected by the processor 102 or by other hardware within the computer system 100. In other embodiments, the error registers 106 may be external to the processor 102.

The processor 102 is capable of executing a system management interrupt (SMI) handler 104. In general, an SMI is non-maskable and the SMI handler cannot be interrupted by another interrupt or event. When an SMI occurs, the state of the system 100 is saved, and the SMI handler 104 is then permitted full access to all registers within the processor, as well as all hardware accessible by the processor. The activities of the SMI handler while in the "system management mode" (SMM) are transparent to an operating system executing in the system 100. The SMI handler 104 thus operates without involvement of the operating system. The SMI handler 104 may use RAM for its operation. The RAM that the SMI handler uses is dedicated for exclusive use by the SMI handler and may be part of the RAM provided on the memory DIMMs 114, 116, 118, and 120.

The timer 122 comprises one or more timer elements. Each timer element is able to count up or down an independently programmable amount of time. The timer 122 may be a component separate from the processor or may be included as part of the processor.

FIG. 1 also shows a counter associated with each memory DIMM. Counter 130 is associated with memory DIMM 114, while counters 132, 134, and 136 are associated with memory DIMMs 116, 118, and 120, respectively. Counters 130-136 may comprise logic separate from the processor 102 and memory DIMMs, or may be part of the processor. Each counter may comprise an "up" counter which counts up from a beginning value (e.g., 0) to a terminal count value, which may be programmable or fixed. Alternatively, each counter may comprise a "down" counter which counts down from a beginning non-zero value to a terminal count value. The beginning non-zero value may be programmable or fixed and the terminal count value may be 0. The SMI handler 104 can access each counter individually to reset the counter and to determine whether the counter has reached its terminal count value.

FIG. 1 also shows a visual indicator associated with each memory DIMM. The visual indicators may comprise light emitting diodes (LEDs) or other types of visual indicators. LED 115 is associated with memory DIMM 114, while LEDs 117, 119, and 121 are associated with memory DIMMs 116, 118, and 120, respectively. Each LED 115, 117, 119, and 121 may be used to indicate the occurrence of a failure of the associated memory DIMM, as will be explained below.

Figure 2:
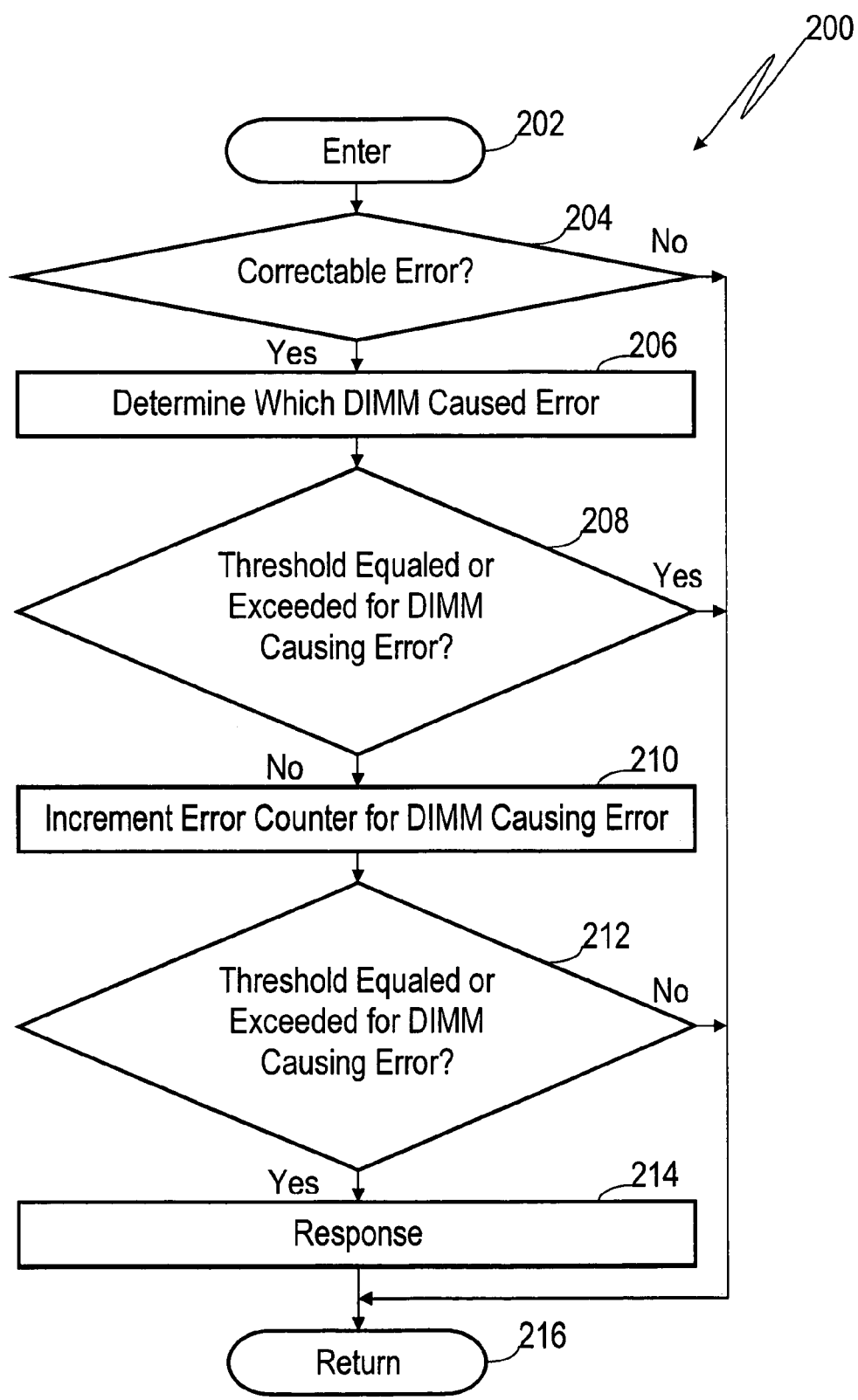
FIG. 2 shows a method embodiment for processing a system management interrupt to track correctable memory errors.

FIG. 2 illustrates a method embodiment 200 of using the SMI handler to track device errors. The embodiment of FIG. 2 is in the context of tracking correctable memory errors, but method 200 may be readily extended to other types of errors and other types of devices. Method 200 is performed by the SMI handler 104 upon expiration of a particular time period. The time period is implemented by the timer 122 via SMI 110. In some embodiments, the time period is 128 milliseconds, but in general can be any time period desired. Upon expiration of the time period, the SMI handler 104 is invoked at 202. At 204, the SMI handler determines whether a memory device has experienced a correctable memory error. This action can be performed by checking a status value within error registers 106 to see if the processor 102 has detected, or has been notified by other hardware that has detected, a correctable memory error. An example of hardware registers includes the Machine Check Architecture (MCA) registers of an AMD Opteron processor.

If a correctable memory error has occurred, the SMI handler determines, at 206, which memory device (e.g., DIMM) caused the error. This action can be performed by reading another hardware register which stores the address of the memory location associated with the correctable error. Once the address has been read, the SMI handler can perform a calculation to determine which DIMM occupies an address range that includes the address of the corrected error. For example, if the four DIMMs of FIG. 1 each occupy a 1 Gigabyte range, are operating in a non-interleaved mode, and are configured such that DIMM 114 occupies the range from 0 to 1 Gigabytes, DIMM 116 from 1 to 2 Gigabytes, DIMM 118 from 2 to 3 Gigabytes, and DIMM 120 from 3 to 4 Gigabytes, a correctable error that was detected at address location 2,400,000,000 would be associated with DIMM 118 (between 2 and 3 Gigabytes).

Referring again to FIG. 2, at decision block 208 the SMI handler 104 determines whether the memory device that experienced the error is experiencing an error rate that equals or exceeds a threshold error rate. An "error rate" refers to the number of errors per a particular time period. The threshold error rate may be programmable or hardcoded into the SMI handler 104 and may be set to a level above which the rate of errors is considered excessive and corrective action may be warranted. The action of block 208 can be performed by comparing the count value of the counter associated with the failed memory DIMM to the threshold value. If the memory DIMM's count value equals or exceeds the threshold, the memory DIMM is considered to have equaled or exceeded the threshold error rate. If the threshold error rate has not been equaled or exceeded, then control passes to block 210 in which the SMI handler increments the counter associated with the failed memory DIMM. Then, at decision 212, the SMI handler again determines whether the memory device that experienced the error is experiencing an error rate that equals or exceeds the threshold error rate. If the answer is "yes," control passes to block 214 in which the SMI handler responds to the occurrence of a memory DIMM that has experienced an error rate at or above the threshold rate. The SMI handler then returns at 216. If the answer is "no," the SMI handler returns.

Going back to decision block 208, if the threshold error rate has been equaled or exceeded, then the SMI handler execution returns at 216. The logic of method 200 is such that decision block 208 will not result in a "yes" answer unless the memory DIMM's error rate has been determined to have equaled or exceed the threshold by a previous execution of the SMI handler. Once a memory DIMM's error rate has been determined to have reached the threshold, the response of block 214 need not be performed again—that is, one execution of the response 214 is generally sufficient. In other embodiments, however, the response action 214 can be performed every time a memory DIMM that has already reached its error rate threshold experiences another error.

The response of block 214 can be any response desired. For example, the SMI handler 104 can illuminate an indicator associated with the DIMM that has exceeded the threshold error rate. For example, the LED associated with the failed DIMM may be illuminated for this purpose. In some embodiments, each LED 115, 117, 119, and 121 may nominally be illuminated to a particular color (e.g., green) and changed to a difference color (e.g., amber) to indicate that the associated DIMM has exceeded the threshold error rate. The SMI handler 104 can individually control each LED. Additionally or alternatively, the SMI handler can illuminate a system health LED 125 to indicate that system 100 is in a degraded state. The system health LED 125 may be visually accessible from outside the system 100, while the memory DIMM LEDs may not be readily visually from outside the system. A user that observes the system health LED 125 being illuminated may open a cover to the system to observe whether any of the memory DIMM LEDs are illuminated.

In addition to, or instead of, illuminating an indicator, the SMI handler 104 may log an error event indicative of the memory DIMM failure. For instance, the SMI handler may store information in the SMI handler's RAM, noted above. The information may include an indication of which memory DIMM exceeded the error rate threshold. Further still, the response 214 may include logging a failure to an event log associated with the system's operating system. By its nature, the SMI handler cannot directly write to the operating system's event log. Thus, the SMI handler generates an interrupt to a system management driver that performs a basic input output system (BIOS) call. The BIOS call returns the information about the memory threshold error rate violation including an identity of the memory DIMM that suffered the violation. The system management driver then logs the failure into the operating system's event log.

Any one or more or all of the aforementioned responses can be implemented. Further, once a user is made aware of a problematic memory DIMM, the user, if desired, can remove the memory DIMM. Further, the user can replace the removed failed memory DIMM.

As explained above, once a memory DIMM has been determined to have equaled or exceeded its error rate threshold, a suitable response is performed to alert a user to that fact. Once the response to the error rate violation has been performed, it is not necessary to again perform the response each time the same memory DIMM experiences a memory error (although in some embodiments, repeated responses can be performed).

Figure 3:
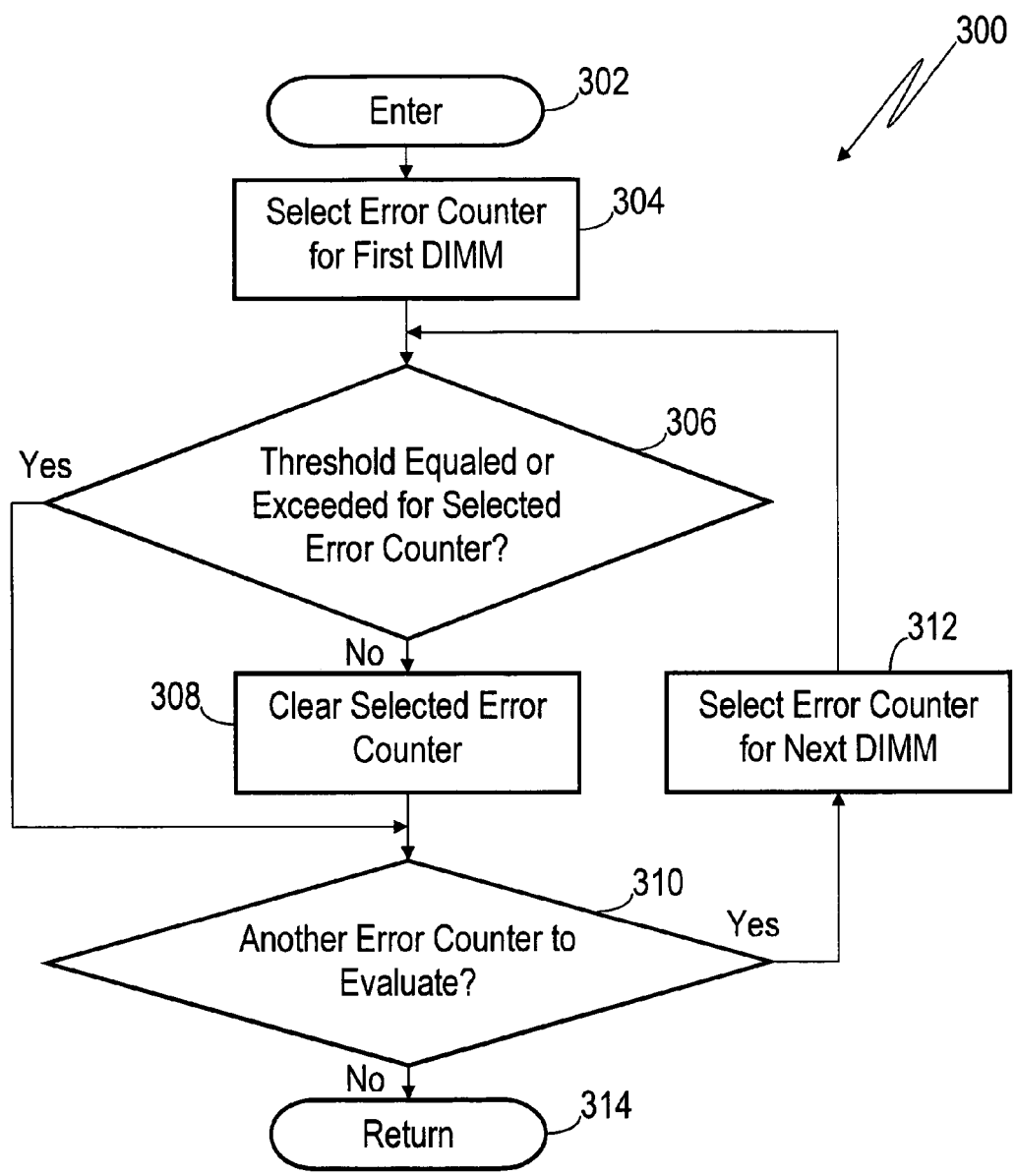
FIG. 3 shows a method embodiment for processing a system management interrupt to periodically reset correctable memory error rate counters.

FIG. 3 shows another method 300 implementable in system 100. Method 300 also is performed by the SMI handler 104. Method 300 is performed by SMI handler 104 periodically. The period at which the method 300 is performed can be any suitable increment of time such as, for example, once per hour, once per day, once per week, etc. One of the timer elements within timer 122 can be programmed for just this purpose, that is, to cause a SMI handler 104 to perform at the 300 at the desired rate.

The purpose of method 300 is to reset all of the memory DIMM counters that have not yet reached the threshold value. This allows the system to track the rate of correctable errors as opposed to an absolute total number of correctable errors. The rate of correctable errors may then be used to determine whether the system is at an increased risk of failure. The method 300 begins at 302 upon expiration of the time period noted above. At 304, the SMI handler 304 selects an error counter for a first memory DIMM. At decision block 306, the SMI handler 104 determines whether count value associated with the selected error counter has equaled or exceeded the threshold value. A "no" answer to decision block 306 means that a memory DIMM associated with the selected counter has either not experienced any errors since the last time method 300 was performed or that the associated memory DIMM has experienced one or more errors since the last time method 300 was performed but the number of errors has not equaled or exceeded the threshold value. That being the case, the associated memory DIMM is not considered to have experienced an excessive rate of memory errors. Accordingly, SMI handler 104 clears the selected error counter at block 308.

If, however, the current count value of the selected error counter does equal or exceed the threshold (a "yes" answer to decision to block 306), the selected error counter is not reset. In other words, once an error counter associated with a failed memory DIMM has reached its threshold value within the period of time associated with the performance of method 300, the state of the error counter is frozen and not reset. This allows the counter to be used as an indicator of whether the particular DIMM has already exceeded the threshold. Alternatively, any variable could be used as this indicator. Once it has been determined that a particular memory DIMM has exceeded the threshold error rate, in accordance with the embodiments described herein, that particular memory DIMM is not again assessed to determine whether it has an error rate that exceeds a threshold period.

At 312, the SMI handler 104 determines whether there is another error counter in system 100 to evaluate. If there is, the error counter associated with the next memory DIMM is selected 312 and control loops back to decision block 306. If, however, there are no more counter errors to evaluate, the SMI handler 104 returns at block 314.

The embodiments described herein are useful in a variety of applications. For instance, some systems do not comprise a mechanism to have an SMI generated upon occurrence of a correctable memory error. By periodically causing an SMI to occur, the SMI handler examines the system for an occurrence of one or more correctable memory errors. The SMI handler can accomplish this since it can execute at a high priority and high privilege level, allowing it to access most, if not all, of computer system 100 with little or no interruption.

The above discussion is meant to be illustrative of the principles and various embodiments of the present invention. Numerous variations and modifications will become apparent to those skilled in the art once the above disclosure is fully appreciated. For example, in at least some embodiments, system bus 112 may couple the counters 130-136, implemented as distinct hardware counters, to the processor 104. In other preferred embodiments the counters may be implemented entirely in software, with the actual counts kept in distinct locations in a memory separate from the memory being monitored (not shown) or in the memory being monitored. It is intended that the following claims be interpreted to embrace all such variations and modifications.

What is claimed is:

1. A system, comprising:
   a device; and
   an interrupt handler executable by a processor;
   wherein said interrupt handler executes, upon expiration of a first time period, to determine if a threshold error rate associated with said device has been equaled or exceeded; and
   wherein, upon expiration of a second time period, said interrupt handler resets an error counter if the threshold rate has not been equaled or exceeded.

2. The system of claim 1 wherein said interrupt handler executes without involvement of an operating system running on said system.

3. The system of claim 1 wherein said interrupt handler comprises a system management interrupt (SMI) handler.

4. The system of claim 1 further comprising a timer whose expiration causes said interrupt handler to be executed and, upon expiring, said timer is reset to begin counting again to cause a subsequent execution of said interrupt handler.

5. The system of claim 1 wherein said device comprises a memory device.

6. The system of claim 1 wherein if said interrupt handler determines that said threshold error rate has been equaled or exceeded, said interrupt handler causes an indicator to be illuminated to indicate the occurrence of the threshold error rate being equaled or exceeded.

7. The system of claim 1 wherein if said interrupt handler determines that said threshold error rate has been equaled or exceeded, said interrupt handler logs the occurrence of the threshold error rate being equaled or exceeded.

8. The system of claim 7 wherein the interrupt handler comprises a system management interrupt (SMI) handler and the SMI handler logs the occurrence in SMI memory.

9. The system of claim 1 wherein if said interrupt handler determines that said threshold error rate has been equaled or exceeded, said interrupt handler causes another interrupt to occur that logs the occurrence of the threshold error rate being equaled or exceeded in a system event log associated with an operating system that runs on said system.

10. The system of claim 1 further comprising a plurality of devices and wherein, upon expiration of said first time period, said interrupt handler also determines which device, if any, experienced an error.

11. The system of claim 10 wherein, if said interrupt handler determined that a device experienced an error, said interrupt handler increments an error counter to track a number of errors determined for said device.

12. The system of claim 11 wherein said interrupt handler determines if the threshold error rate has been equaled or exceeded by determining whether a count value of said error counter equals or exceeds a threshold count value.

13. The system of claim 11 wherein, upon expiration of the second time period, said interrupt handler resets said error counter if said error counter has a count value that is less than a threshold value.

14. The system of claim 11 wherein, upon expiration of the second time period, said interrupt handler does not reset said error counter if said error counter has a count value that is equal to or greater than a threshold value.

15. A system, comprising:
   means for determining whether a device within the system has experienced an error upon expiration of a periodic time interval;
   means for incrementing an error counter associated with a device that is determined to have experienced an error;
   means for determining whether a count value of said error counter equals or exceeds a threshold; and
   means for resetting said error counter if said error counter does not equal or exceed said threshold upon expiration of another periodic time interval.

16. The system of claim 15 further comprising means for indicating an occurrence of an error.

17. A method, comprising:
   upon expiration of a periodic time interval, determining whether a device within a system has experienced an error;
   incrementing an error counter associated with a device that is determined to have experienced an error;
   determining whether a count value of said error counter equals or exceeds a threshold; and
   resetting said error counter upon expiration of another periodic time interval if a count value of said error counter has not equaled or exceeded the threshold.

18. The method of claim 17 wherein determining whether a device has experienced an error comprises executing a system management interrupt handler.

19. The method of claim 17 further comprising illuminating an indicator if said count value equals or exceeds the threshold.

20. The method of claim 17 further comprising logging an error event if said count value equals or exceeds the threshold.

21. The method of claim 17 further comprising logging an error event if said count value equals or exceeds the threshold, said error event identifies of the device that experienced the error.

22. A storage medium containing a system management interrupt handler that, when executed by a processor, causes the processor to:
   upon expiration of a periodic time interval, determine whether a device within a system has experienced an error;
   increment an error counter associated with a device that is determined to have experienced an error;
   determine whether a count value of said error counter equals or exceeds a threshold; and
   reset said error counter upon expiration of another periodic time interval if a count value of said error counter has not equaled or exceeded the threshold.

* * * * *